US012627029B2

(12) United States Patent
Hengstler

(10) Patent No.: US 12,627,029 B2
(45) Date of Patent: May 12, 2026

(54) SENSOR ASSEMBLY WITH ALIGNMENT DEVICE

(71) Applicant: VEGA GRIESHABER KG, Wolfach (DE)

(72) Inventor: Clemens Hengstler, Haslach (DE)

(73) Assignee: VEGA GRIESHABER KG, Wolfach (DE)

( * ) Notice: Subject to any disclaimer, the term of this patent is extended or adjusted under 35 U.S.C. 154(b) by 462 days.

(21) Appl. No.: 17/996,140

(22) PCT Filed: Sep. 24, 2020

(86) PCT No.: PCT/EP2020/076787
§ 371 (c)(1),
(2) Date: Oct. 13, 2022

(87) PCT Pub. No.: WO2021/209162
PCT Pub. Date: Oct. 21, 2021

(65) Prior Publication Data
US 2023/0130890 A1     Apr. 27, 2023

(30) Foreign Application Priority Data

Apr. 15, 2020     (WO) ................. PCT/EP2020/060614
Apr. 15, 2020     (WO) ................. PCT/EP2020/060615

(51) Int. Cl.
*H01Q 1/22*          (2006.01)
*G01F 23/284*       (2006.01)

(52) U.S. Cl.
CPC ........... *H01Q 1/225* (2013.01); *G01F 23/284* (2013.01)

(58) Field of Classification Search
CPC ........ H01Q 1/225; H01Q 3/08; H01Q 19/062; H01Q 21/065; H01Q 21/08; H01Q 1/42;
(Continued)

(56) References Cited

U.S. PATENT DOCUMENTS 9,404,787 B2     8/2016   Cheng et al.
2015/0048963 A1*   2/2015   Dieterle ................ G01F 23/284
                                                  342/5
(Continued)

FOREIGN PATENT DOCUMENTS

CN          102042859 A          5/2011
CN          105874307 A          8/2016
(Continued)

OTHER PUBLICATIONS

International Search Report issued Jan. 12, 2021 in PCT/EP2020/076787 filed on Sep. 24, 2020, 2 pages.
(Continued)

*Primary Examiner* — Vladimir Magloire
*Assistant Examiner* — Remash R Guyah
(74) *Attorney, Agent, or Firm* — Oblon, McClelland, Maier & Neustadt, L.L.P.

(57)          ABSTRACT

A sensor arrangement is provided for level measurement or limit level measurement of a filling material or a bulk material in a container, the sensor arrangement including: a sensor with an antenna; and a sensor housing having an alignment device including a first portion and a second portion configured to receive the antenna, the first portion and the second portion being configured to be rotatable relative to each other, in which the alignment device is configured to change a radiation direction of a measurement signal of the sensor by rotating the first section and/or the second section. A sensor housing including an alignment device is also provided.

24 Claims, 11 Drawing Sheets

(58) Field of Classification Search

CPC ........ H01Q 15/02; H01Q 1/2233; H01Q 3/14;
G01F 23/284; G01F 25/20; G01F 23/292;
G01F 23/296; G01S 7/40; G01S 13/426;
G01S 13/88; G01S 13/89; G01S 13/60;
G01S 7/027; G01S 13/103; G01S 7/03;
G01S 13/42; G01N 21/15

USPC .............. 342/124, 118; 73/290 R; 248/183.2

See application file for complete search history.

(56) References Cited

U.S. PATENT DOCUMENTS

| | | | | |
|---|---|---|---|---|
| 2015/0241261 A1* | 8/2015 | Cheng | .................. | G01F 23/284 |
| | | | | 342/124 |
| 2016/0282168 A1* | 9/2016 | Fehrenbach | .......... | G01F 23/241 |
| 2017/0162928 A1* | 6/2017 | Fehrenbach | ......... | H01Q 1/1221 |
| 2018/0335332 A1* | 11/2018 | Welle | ....................... | H01Q 3/08 |
| 2019/0353514 A1* | 11/2019 | Kienzle | ................... | G01S 13/88 |

FOREIGN PATENT DOCUMENTS

| | | |
|---|---|---|
| CN | 105981220 A | 9/2016 |
| CN | 106030901 A | 10/2016 |
| CN | 109564127 A | 4/2019 |
| JP | 63-210733 A | 9/1988 |

OTHER PUBLICATIONS

European Office Action issued May 31, 2024 in European Patent Application No. 20 755 025.8, 5 pages.

International Preliminary Report on Patentability issued on Oct. 27, 2022 in PCT/EP2020/076787 filed on Sep. 24, 2020 (with English translation), 17 pages.

Chinese Office Action and Search Report issued Jul. 25, 2025 in corresponding Chinese Patent Application No. 202080099837, 13 pages.

* cited by examiner

SENSOR ASSEMBLY WITH ALIGNMENT DEVICE

REFERENCE TO RELATED APPLICATIONS

The present application claims the priorities of International Patent Application Nos. PCT/EP2020/060614, filed Apr. 15, 2020, and PCT/EP2020/060615, filed Apr. 15, 2020, which are incorporated herein by reference in their entirety.

FIELD OF INVENTION

The invention relates to sensor arrangements for use in an industrial environment. In particular, the invention relates to a sensor arrangement for level or limit measurement of a product or bulk material in a container, a sensor housing with an alignment device for mounting and aligning a sensor arrangement on a container, the use of a sensor arrangement for level or limit measurement of a product or bulk material in a container, and the use of a sensor housing with an alignment device for mounting and aligning a sensor arrangement on a container.

BACKGROUND OF THE INVENTION

Measuring sensors are frequently used in the industrial environment, for example for level measurement, limit level measurement, flow measurement, pressure measurement, level or flow velocity measurement or temperature measurement. Secure mounting of such sensors on the vessels to be measured is of great importance for reliable measurement, especially if a lid of a vessel, such as a GRP (glass fiber reinforced plastic) silo, in a process plant is provided with an oblique or irregularly shaped outer contour.

SUMMARY OF THE INVENTION

It is an object of the invention to specify a measuring sensor with flexible usability and high reliability for various process vessels in a process plant.

The object is solved by the features of the independent patent claims. Further embodiments of the invention result from the subclaims and the following description.

One aspect of the present disclosure relates to a sensor arrangement for level or point level measurement of a product or bulk material in a container. The sensor arrangement includes a sensor having an antenna, a sensor housing having an alignment device. The alignment device of the sensor housing has a first section and a second section adapted to receive the antenna. The first section and the second section are configured to be rotatable relative to each other. The alignment device is arranged to change the radiation direction of the measurement signal of the sensor by rotating the first section and/or the second section.

The sensor of the sensor arrangement may be a radar sensor and may be set up as a non-contact measuring sensor for emitting and receiving an electromagnetic measuring signal or measuring beam.

The sensor arrangement can be mounted or arranged outside a process vessel or on the outside of a vessel roof, even if the vessel roof is sloped, partially sloped, for example cone-shaped, lump-shaped. When mounted on an inclined container roof, the sensor may be oriented vertically downward or in the direction of the product or bulk material in the container. The sensor may, for example, be set up for level or limit level measurement through the container roof.

The first section and the second section may form the alignment device such that the first section and the second section of the alignment device may rotate or pivot relative to each other, thereby changing the orientation of the antenna received by the second section.

The first section of the sensor housing may be arranged below the second section of the sensor housing. Thus, in each case, the first section may be a lower portion and the second section may be an upper portion of the sensor housing. The first section and the second section may be directly or indirectly connected.

Furthermore, the first section may be mounted in close proximity to the container or on the outside of the container roof. Thus, the second section can be mounted to the container over the first section and the sensor assembly can be fixed to the container by the lower first section.

The container can be a plastic container or a GRP container.

For example, the sensor can be glued to the outside of the container by means of the sensor housing or the alignment device in order to measure the filling material or bulk material in the container. The adhesive mounting can advantageously allow easy and quick insertion of the measuring sensor. The sensor arrangement can be optimized in such a way that the measuring signal or the measuring beam is always emitted through the same materials of the container and/or the sensor housing with the same material thicknesses and thus cannot be deflected or deformed. This can result in a reliable measurement with the sensor arrangement.

The rotatability of the first section and the second section of the sensor housing can advantageously allow the antenna or the measuring signal to be aligned in a specific orientation to the product, for example in a vertical orientation or perpendicular to the surface of the product, even when mounted on an inclined container roof. The rotation can be controlled manually or automatically.

The change of the alignment of the antenna and the radiation direction of the measuring signal by means of the alignment device can advantageously enable an undisturbed or unobstructed measuring signal even in the case of the inclined mounting and thus ensure a reliable level, limit level or topology determination of a filling material or a bulk material in the container.

The radiation direction can be changed with respect to the lower surface. It can also be provided that the mounting direction or the mounting angle can be changed by the rotation as an alternative or in addition to the radiation direction.

The radar sensor can be designed for process automation in an industrial environment. It can be used in agriculture, for example for monitoring mobile drinking water or feed containers. For example, the radar sensor can be used in factory automation or for building automation.

Alternatively or additionally, the radar sensor can be used in private homes, such as for a classic installation on a GRP fuel oil tank or rainwater cistern.

The term "process automation in the industrial environment" can be understood as a subfield of technology that includes all measures for the operation of machines and plants without the involvement of humans. One goal of process automation is to automate the interaction of individual components of a plant, for example in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subarea of process automation in the industrial environment concerns the logistics automation of plants and the logistics automation of supply chains. Distance and angle sensors are used, for example, in the field of logistics automation to automate processes within a building or within a single logistics facility. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

According to an embodiment, the first section includes a first cavity and the second section includes a second cavity in which the antenna is disposed.

The first cavity and the second cavity may form a common cavity. Alternatively, the first cavity and the second cavity may each be formed as a separately closed cavity.

The antenna of the sensor can be arranged in the second cavity of the second section and set up to radiate the measurement signal or the measurement beam from the sensor via the first section or via the first cavity through the sensor housing and/or the container roof and to receive the measurement signal reflected from the filling material or bulk material.

The alignment device may be designed so that the cavities of the sensor housing have a high degree of protection. For example, the first cavity and the second cavity may each have air or vacuum inside the first section and the second section, respectively, to eliminate or at least minimize influences on the measurement results that may be caused by beam deflection of the measurement signal as it passes through the alignment device.

The antenna of the sensor arrangement can be, for example, a horn antenna or a parabolic antenna or a lens antenna. Alternatively, the antenna can be an array antenna, with which the sensor arrangement can also be set up to detect the topology of the filling material or the bulk material.

The sensor arrangement may further comprise electronics, for example comprising a circuit board, to which the antenna may be connected. The electronics may comprise a circuit board and may be disposed in the second cavity of the second section of the alignment device or sensor housing.

According to another embodiment, the antenna is arranged off-center or centered in the second portion of the sensor housing.

By placing the antenna off-center in the second section, the height or position of the antenna and/or the orientation of the measurement signal from the antenna can be changed after mounting on the container by rotating the first section and/or the second section relative to each other.

For a further embodiment, the upper rotatable part of the housing could have a display and or keys. So first the sensor can be adjusted to the measuring task (angle) and then the display can be rotated to the correct position for better readability for a user.

According to a further embodiment, the sensor arrangement further comprises a polarization device arranged to change the polarization of the measurement signal by rotating the first section and/or the second section.

The polarization device may be provided in the first section of the sensor housing. Alternatively or additionally, the polarization device may be provided between the first section and the second section or between the first section and the container roof.

The provision of the polarization device can advantageously change the alignment of the measurement signal of the sensor by changing the polarization device, especially when the antenna is centered in the second section of the sensor housing and the alignment or position of the antenna after mounting cannot be changed by rotating the first section and/or the second section, or can only be changed.

According to a further embodiment, the sensor housing is completely closed and/or cannot be opened non-destructively.

Alternatively, the sensor housing may not be completely closed and may, for example, have an opening in the first section that is closed by the container roof during installation. Thus, the measuring beam can only be emitted through the container roof and the interferences can thus be further reduced.

The closed sensor housing can be used to protect the sensor or the cavities of the sensor assembly from contamination or environmental influences, for example, in outdoor applications or very dirty or dusty atmospheres.

According to a further embodiment, the sensor is designed as a stand-alone radar sensor (AuRa sensor).

The self-sufficient display device is a display device that can obtain the energy required to operate the display device from an internal energy source rather than a wired external energy source. The self-contained radar sensor may have an internal power supply, for example in the form of a battery or accumulator. The energy supply may be charged inductively from the outside or wirelessly using energy harvesting.

In addition, the radar sensor can have a radio interface that is set up to wirelessly transmit the radar sensor data that the sensor acquires or calculates to an external receiver, such as a cell phone or a server.

According to a further embodiment, the sensor arrangement further comprises a A sensor assembly comprising a first portion, a second portion, and a third portion, the first portion and the container having attachment means disposed between the first portion and the container and adapted to attach the sensor assembly to the container via the first portion.

By means of the mounting device, for example, the sensor arrangement can be mounted by adhesive mounting. In this case, an adhesive surface can be provided between the lower side of the sensor housing and the container roof. Alternatively or additionally, the mounting device can have a mounting plate.

Alternatively or additionally, the fastening device can be designed as a screw connection or a flange connection.

According to another embodiment, the sensor arrangement comprises an absorber device made of an absorber material and arranged in the first portion of the sensor housing.

The absorber material can be mounted inside the sensor housing or on the inner side wall of the first section to reduce the spurious reflections caused by the first reflection by the plastic container, especially in the case of the angled arrangement. The absorber material attached in the housing can, for example, absorb or attenuate the radar energy of the measurement signal that may be generated by the inner part of the sensor housing, the adhesive surface or the container roof or walls due to spurious reflection. Thus, it can be avoided or at least prevented that interfering signals from the interfering reflection get back to the radar sensor and thus influence the measurement results.

The sensor assembly may include a seal between the first section and the second section, or at the junction of the first and second sections, to seal the first cavity and/or the second cavity.

According to a further embodiment, the first section and the second section each have the shape of an obliquely cut hollow cylinder and are arranged to form the sensor housing of the alignment device integrally and cylindrically. The sensor housing has an inclined surface disposed between the first section and the second section, and is configured such that the first section and the second section are rotatable relative to each other via the inclined surface.

At the inclined surface, the first portion is connected to the second portion. The inclined surface may be virtually formed when the first cavity and the second cavity form a common cavity of the sensor housing. Alternatively, the inclined surface may be provided as a rotating surface between the closed cavities, namely the first cavity and the second cavity.

The alignment device may thus have a first axis of rotation by means of the rotatable first and second sections.

According to a further embodiment, the antenna of the sensor is configured to protrude into the first cavity.

In the case where the first cavity and the second cavity form a common cavity of the sensor housing, the antenna may be centered or off-centered in the second cavity of the second section attached to the sensor housing and may also be disposed in the first cavity without contacting the lower side of the first section. If the antenna is off-center, the antenna may be attached to the shorter part of the housing portion of the second section. Thus, the measuring sensor can be arranged in the immediate vicinity of the container.

According to an embodiment, the sensor housing includes a third section having a third cavity disposed between the first section and the second section and configured to be rotatable relative to the first section and/or the second section, respectively.

According to another embodiment, the first section and the third section are each formed as an obliquely cut hollow cylinder and the second section is formed as a hollow cylinder. The first section, the second section, and the third section are adapted to form the sensor housing integrally and cylindrically.

The sensor housing has an inclined surface disposed between the first section and the third section and configured such that the first section and the third section are rotatable relative to each other via the inclined surface, and a straight surface disposed between the second section and the third section.

Thus, the alignment device of the sensor arrangement can have two rotation axes and/or two rotation surfaces, namely the oblique surface and the straight surface. Thus, the sensor arrangement can have with higher flexibility to change the alignment of the measurement signal.

The alignment device of the sensor arrangement may have a plurality of rotation axes and/or rotation surfaces, for example with smaller rotation angles.

The sensor housing may be integrally formed such that the first cavity, the second cavity, and the third cavity may form a common cavity or each may be formed as a closed cavity. Alternatively, the first cavity and the third cavity may form a common cavity and the second cavity in which the antenna is attached to the sensor housing may be formed as a closed cavity.

According to another embodiment, the antenna of the sensor in the second cavity is configured to protrude into the first cavity and/or the third cavity.

Raging of the antenna into the first cavity and the third cavity can only occur when the common cavity is formed by the first cavity, the second cavity, and the third cavity.

According to a further embodiment, the antenna is configured to be arranged at a highest position by rotating the second section relative to the third section and rotating the third section relative to the first section. Thus, the antenna can be arranged in the immediate vicinity of the container roof.

When mounted at an angle, the sensor assembly can be attached to the container via an adhesive surface, for example. The third section of the sensor housing can be rotated such that the second section can be horizontal with the sensor and the antenna can align in a predetermined direction to radiate the measurement signal. For example, the second section can be rotated until the antenna can be located at the highest part of the attached sensor housing.

According to another embodiment, the second section is formed separably from the first section and the third section. The sensor housing has a first housing unit formed by the first section and the third section, and a second housing unit formed by the second section.

According to a further embodiment, the sensor arrangement further comprises a second fastening device arranged between the first housing unit and the second housing unit and arranged for connecting the first housing unit and the second housing unit.

When the antenna is arranged in the closed second cavity of the second section or in the second housing unit, the second housing unit may be attached to the first housing unit, for example, by means of an attachment device such as an adhesive tape. Thus, the second housing unit with the sensor arranged therein with the antenna can be designed as a self-sufficient radar sensor and the second housing unit can be designed as a separate alignment device or adapter for mounting and aligning the sensor.

According to an embodiment, the first section has the shape of a bracket and the second section of the alignment device has the shape of a ball segment.

Alternatively, the first section may be in the form of a hollow cylinder having the first cavity.

The second section of the alignment device may be in the form of a hollow sphere or a spherical segment or a hollow spherical segment having a second cavity in which the sensor or antenna and/or electronics are disposed. For example, the hollow sphere segment may be closed and have a closed second cavity.

The hollow ball segment may be a socket.

The first section and the second section may be rotatably connected to each other, for example, by means of a threaded connection or a snap-on connection.

According to a further embodiment, the sensor arrangement further comprises a sealing element arranged to seal the sensor housing.

For example, the sealing element may be an O-ring seal and located in the spherical region of the sensor assembly.

A beam deflecting device, such as a lens, may be provided in the lower part of the second section to deflect the measurement beam or signal, for example.

As an alternative to the hollow spherical second section, the second section may be in the form of a flattened spherical segment.

According to an embodiment, the first portion has the shape of a bracket and the second portion of the sensor housing has the shape of a flattened spherical segment.

According to an embodiment, the first section has the shape of a support device and the second section of the sensor housing has the shape of a hollow cylinder. The second section is connected to the first section by a connecting device.

The connecting device can be, for example, a screw connection. The first section can be designed as a base or a mounting bracket. The sensor can thus be connected to a mounting plate via the mounting bracket, for example.

According to a further embodiment, the sensor device further comprises a third section having the shape of a rubber sleeve and arranged between the first section and the second section.

The rubber sleeve may include a third cavity and be configured to close and protect the space between the sensor in the second section and the support device of the first section.

According to a further embodiment, the sensor arrangement further comprises a filter arranged at the first portion and/or the third portion of the sensor housings.

The filter may be a pressure equalization filter and may be provided in the first cavity and/or the third cavity of the embodiments described above, as an alternative or in addition to the absorber device.

Another aspect of the present disclosure relates to a sensor housing having an alignment device adapted for mounting and aligning a sensor assembly to a container for level or point level measurement of a product or bulk material in the container.

Another aspect of the present disclosure relates to the use of a sensor arrangement for level or point level measurement of a product or bulk material in a container.

Another aspect of the present disclosure relates to the use of a sensor housing with an alignment device for mounting and aligning a sensor arrangement on a container for level or point level measurement of a product or bulk material in the container.

In the following, further embodiments of the present disclosure are described with reference to the figures. Where identical reference signs are used in the following description of figures, these designate identical or similar elements. The representations in the figures are schematic and not to scale.

SHORT DESCRIPTION OF THE FIGURES

DETAILED DESCRIPTION OF EXAMPLARY EMBODIMENTS

Figure 1A:
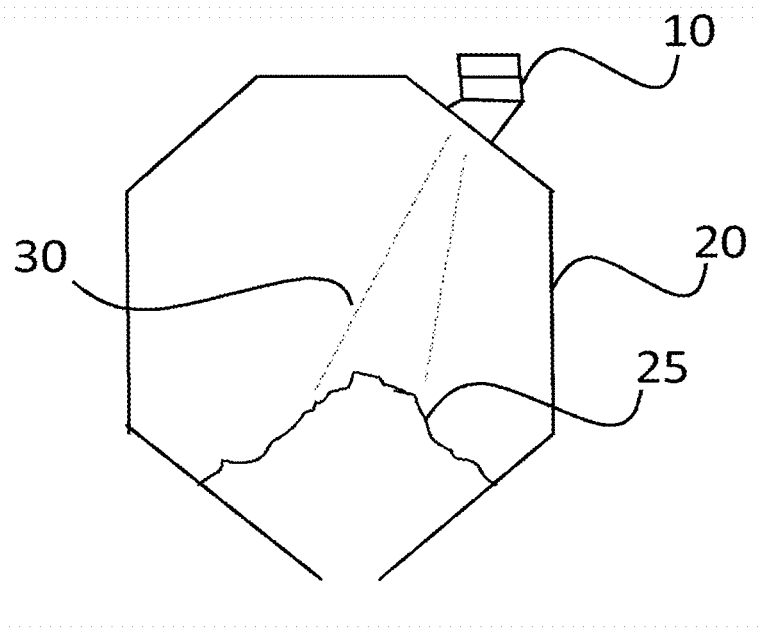
FIG. 1a shows a schematic diagram of a measurement setup of a sensor arrangement according to an embodiment.

FIG. 1a schematically shows a measurement setup of a sensor arrangement 10 according to an embodiment. The sensor arrangement 10, which comprises a sensor, is mounted or installed outside a container 20 or on the sloping container roof and is arranged for level or limit level measurement of a filling material or a bulk material 25 in the container. The sensor arrangement 10 is adapted to emit and receive a measurement signal 30 or a measurement beam through the container roof.

Figure 1B:
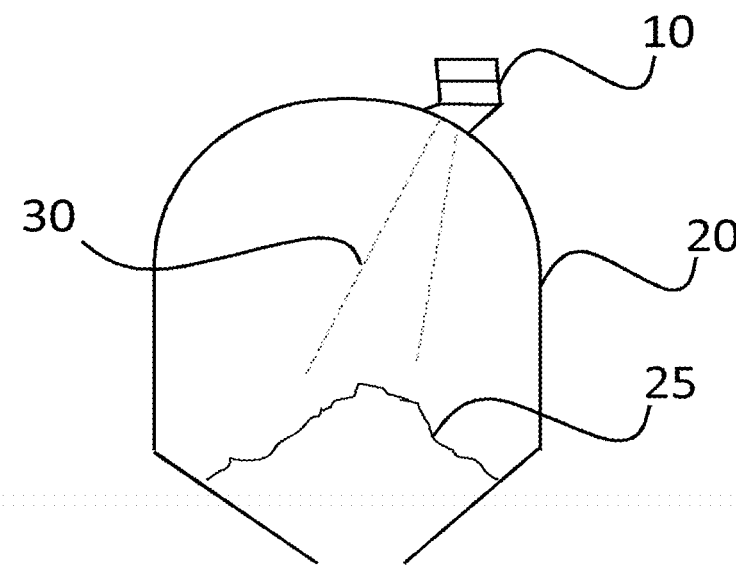
FIG. 1b shows a schematic diagram of a measurement setup of a sensor arrangement according to an embodiment.

The container 20 with the sloped container roof may be made of a plastic or a GRP. For example, the container in FIG. 1 may be a GRP silo that has a cone-shaped container lid when used in an animal feed system. Alternatively, FIG. 1b shows a GRP tank as the container 20 with a round container lid.

Importantly, when the sensor assembly is mounted on the sloped container roof, the sensor may be oriented substantially vertically downward or toward the product or bulk material 25 for reliable measurement.

Figure 2:
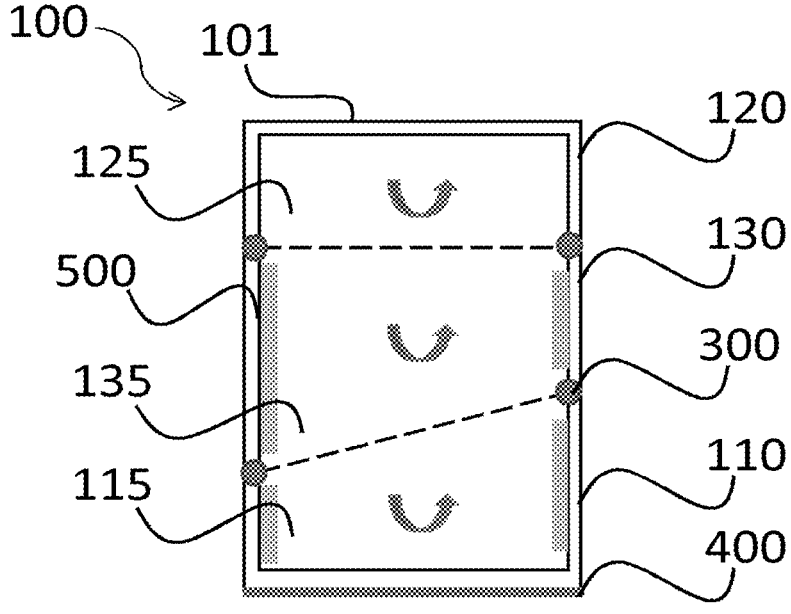
FIG. 2 shows a schematic side view of a sensor housing of a sensor arrangement according to an embodiment.

FIG. 2 shows a sensor housing 100 having an alignment device 101 that includes the sensor arrangement 10. The alignment device 101 of the sensor housing 100 includes a first portion 110, a second portion 120, and a third portion 130.

The first section 110 has a first cavity 115 and is arranged as a lower part of the sensor housing. The second section 120 has a second cavity 125 and is arranged as an upper part of the sensor housing. The third section 130 has a third cavity 135 and is disposed between the first section 110 and the second section 120.

The first section 110, the second section 120, and the third section 130 are connected and adapted to form the sensor housing 100 integrally and cylindrically. In this regard, the second section 120 is formed as a hollow cylinder and the first section 110 and the third section 130 are each formed as an obliquely cut hollow cylinder. The sensor housing 100 may be completely closed and/or may be non-destructively openable.

The third section 130 is configured to be rotatable relative to the first section 110 and/or the second section 120, respectively. In other words, the housing portions, namely the first section 110, the second section 120 and the third section 130, are rotatable relative to each other. Thus, the sensor housing 100 has two axes of rotation or two surfaces of rotation, which are an oblique surface disposed between the first section 110 and the third section 130, and a straight surface disposed between the second section 120 and the third section 130.

The cavities 115, 125, 135 of the sensor housing may form a common cavity or each may be formed as a separate, closed cavity. The rotation surfaces of the sensor housing 110 may each be provided by the cut surfaces or edges at the junctions between the first and third sections 110, 130 and between the second and third sections 120, 130. In the case where the common cavity is formed, the rotation surfaces may be virtual rotation surfaces.

A sealing member 300 may be provided at the junctions between the first, second, and third sections 110, 120, 130 to seal the sensor housing 100.

Air or vacuum may be present in the cavities. Further, an absorber device 500 comprising an absorbent material may be provided, for example, in the first cavity 115 and/or in the third cavity 135 or on the inner walls of the first section 110 and the third section 130. The absorber device 500 may be arranged to protect the measurement signal from deflection or attenuation as it passes through the alignment device, so that the interference effects on the measurement results can be eliminated or at least minimized.

The sensor of the sensor arrangement 10 may include an antenna 200, which may be, for example, a horn antenna, array antenna, or lens antenna, or a parabolic antenna.

Figure 4A:
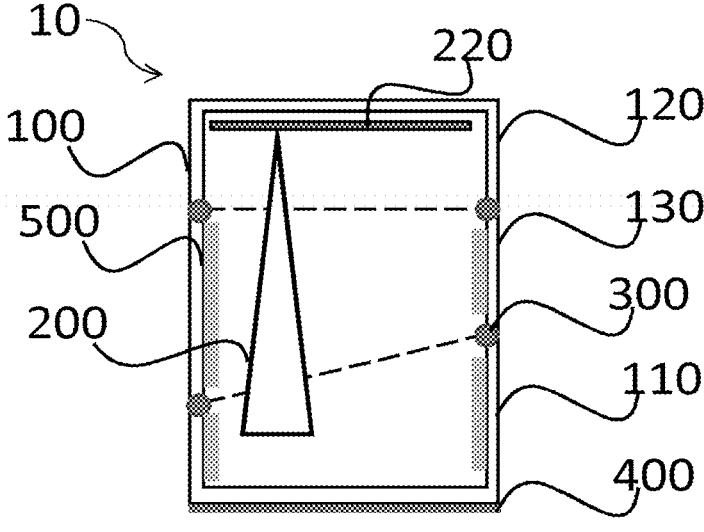
FIG. 4a shows a schematic diagram of a sensor arrangement according to an embodiment.
Figure 4B:
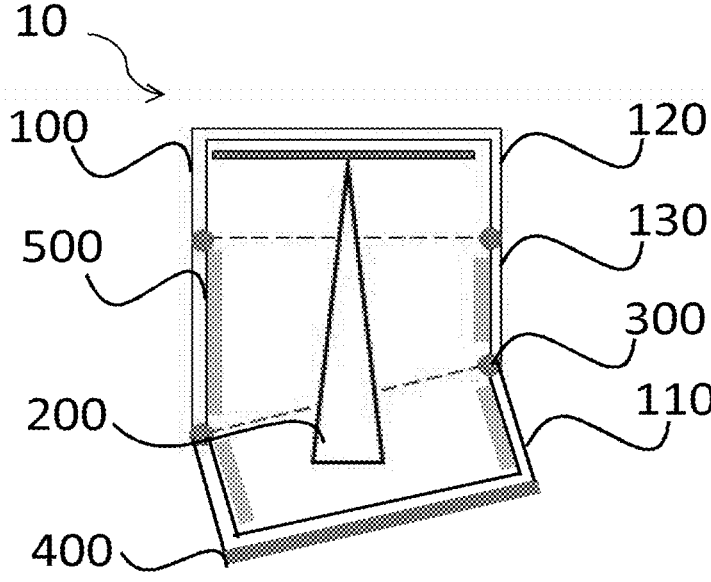
FIG. 4b shows a schematic representation of a sensor arrangement according to a further embodiment.
Figure 4C:
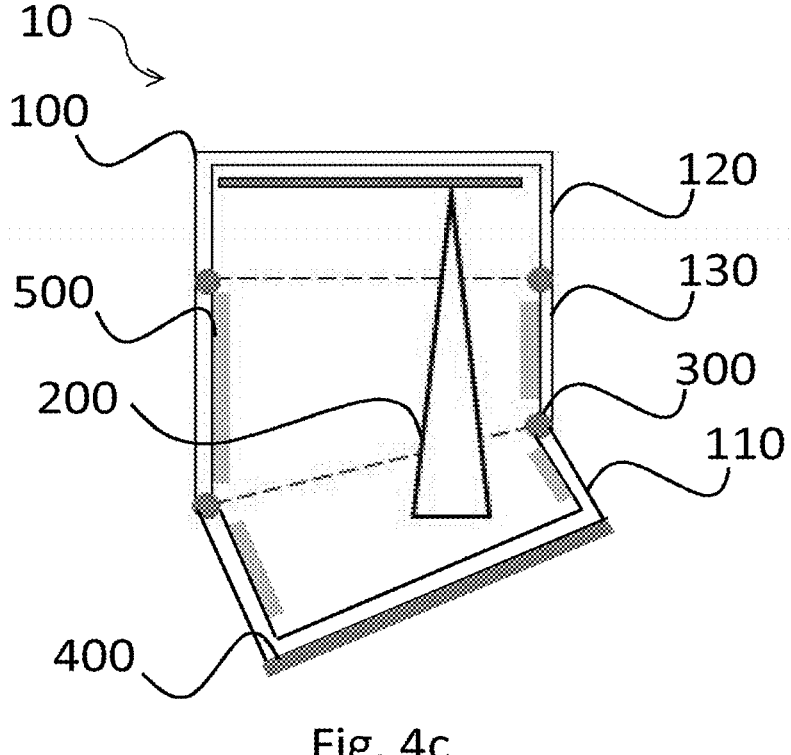
FIG. 4c shows a schematic representation of a sensor arrangement according to a further embodiment.

As shown in FIGS. 4a-c, the antenna 200 is received in the sensor housing 100 through the second portion 120 or is secured or disposed in the upper portion of the second cavity 125.

Figure 3:
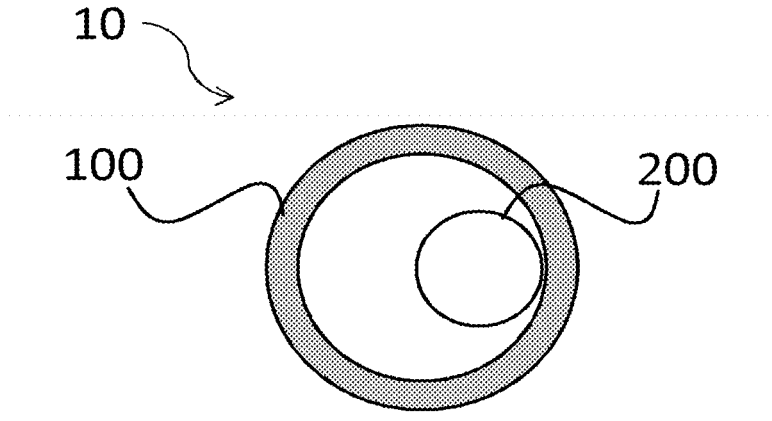
FIG. 3 shows a schematic top view of a sensor arrangement according to an embodiment.

Furthermore, FIG. 3 shows in a top view of the sensor arrangement 10 that the antenna 200 may be arranged off-center in the sensor housing 100.

The sensor arrangement 10 in FIGS. 4a-c further comprises electronics 220 including a circuit board connected to the antenna 200 and mounted and secured in the upper portion of the sensor housing or the second portion 120.

Figure 6A:
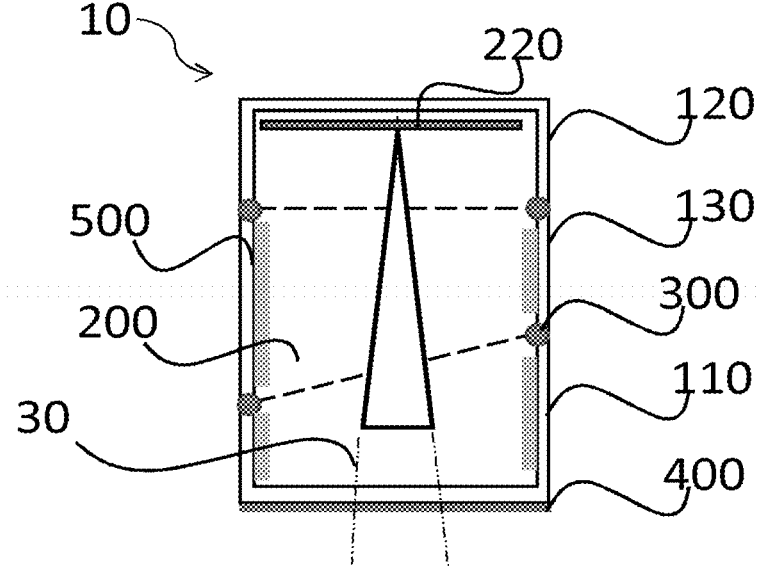
FIG. 6a shows a schematic diagram of a sensor arrangement according to an embodiment.
Figure 6B:
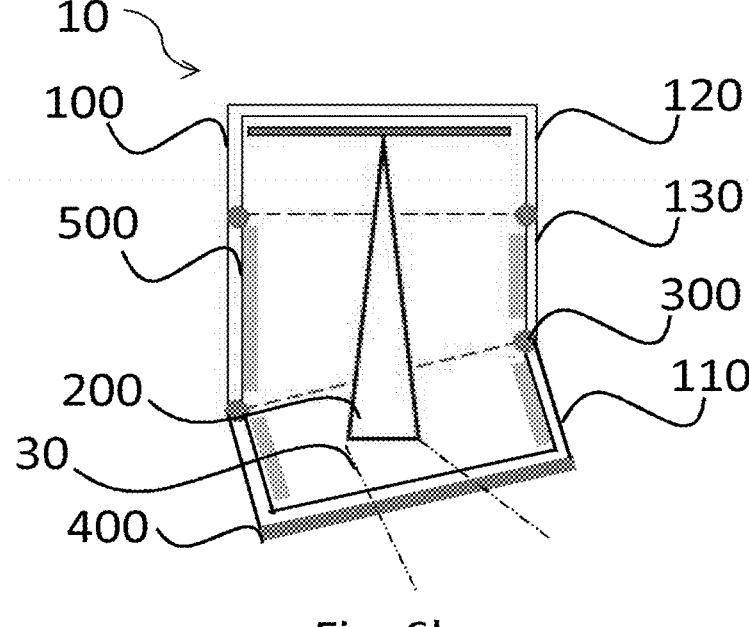
FIG. 6b shows a schematic representation of a sensor arrangement according to a further embodiment.

Alternatively, the antenna 200 may be fixed centrally in the sensor housing 100 and/or in the cavity 125 of the second section 120, as shown in FIGS. 6a-b. The antenna 200 is configured to protrude into the first cavity 115 and/or the third cavity 135.

The sensor arrangement 10 further comprises a mounting device 400 provided at the lower side of the sensor housing 100. When the sensor arrangement is mounted to the sloped roof of the container 20, the mounting device 400 is disposed between the first section 110 and the container 20 and is configured to mount the sensor arrangement 10 over the first section 100. The mounting may be performed by an adhesive mounting via an adhesive surface, i.e., the mounting device 400 may be an adhesive, such as an adhesive tape. Thus, an adhesive surface may be provided between the lower side of the sensor housing 100 or the first section 110 and the container roof. Alternatively or additionally, the mounting device 400 may be a mounting plate.

When the sensor arrangement 10 with the off-center antenna 200 is attached to the container roof, the alignment device 101 may be arranged to change the radiation direction of the measurement signal 30 of the sensor by rotating the first section 110 and/or the second section 120 and/or the third section 130.

FIG. 4a shows that the sensor housing 100 is still cylindrical, for example, without rotating the sections 110, 120, 130, and the antenna is located on the left side of the sensor housing 100 and oriented in a vertical direction. In FIG. 4b, after being placed on the sloped container roof, the third section 120 may be rotated, for example 90 degrees, so that the cylindrical second section 120 may be horizontal or an acute angle may be formed between the vertical orientation of the antenna 200 and the container roof. Furthermore, the second section may be rotated, for example, 90 degrees, so that the antenna 200 may be positioned in the center of the second section, as shown in FIG. 4b. Thus, the position of the antenna 200 in the sensor housing 100 can be changed by rotating the third section 130 and/or the second section 120. Compared to FIG. 4b, the container 20 in FIG. 4c has a more inclined container roof on which the sensor arrangement 10 is mounted by means of the mounting device 400. The third section 130 may further be rotated, for example 180 degrees, so that the second section 120 may be disposed horizontally or a smaller acute angle may be formed between the orientation of the vertical alignment of the antenna 200 and the container roof. The second section 120 may further be rotated, for example by 180 degrees, such that the antenna 200 may be positioned on the right side as shown in the side view, as shown in FIG. 4c, or symmetrically with respect to the position of the antenna where the antenna is on the left side before rotation.

By rotating the second section 120 and/or rotating the third section 130 during assembly by means of the first section 110, the antenna 200 may be formed so that the antenna 200 may be located at a highest position on the container roof. The measurement signal may be emitted at the highest position from the measurement sensor or from the antenna through the container roof and may be emitted perpendicular to the surface of the filling material or in the direction of the filling material.

The sensor arrangement 10 can advantageously allow the sensor to be easily mounted on a process vessel having a sloped, for example, conical or round or lump-shaped vessel lid, while providing a reliable measurement.

As shown in FIGS. 6a-b, a polarization device may additionally be provided in the sensor arrangement 10 or in the sensor housing 30, for example in the first section 110, which is arranged to change the polarization of the measurement signal 30 by rotating the first section 110, the second section 120 or the third section 130. Alternatively or additionally, the polarization device may be provided between the first section and the second section or between the first section and the container roof. The provision of the polarization device can facilitate and significantly optimize the change of alignment of the antenna 200 or of the measuring signal 30 in the direction of the filling material or bulk material, in particular if the antenna 200 is arranged centrally in the second section 200 and thus the position or the height of the antenna cannot be changed by rotating the second section and/or if the container roof has a particularly inclined design and an additional adjustment of the radiation direction of the measuring signal is necessary, for example as a fine adjustment.

Figure 5A:
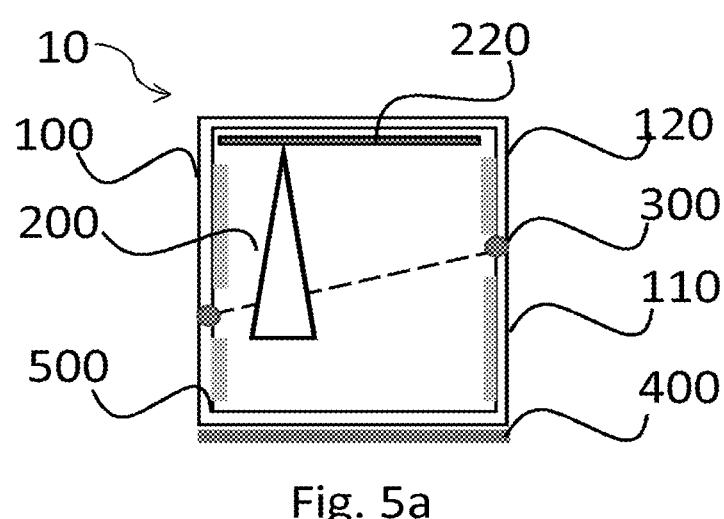
FIG. 5a shows a schematic diagram of a sensor arrangement according to an embodiment.
Figure 5B:
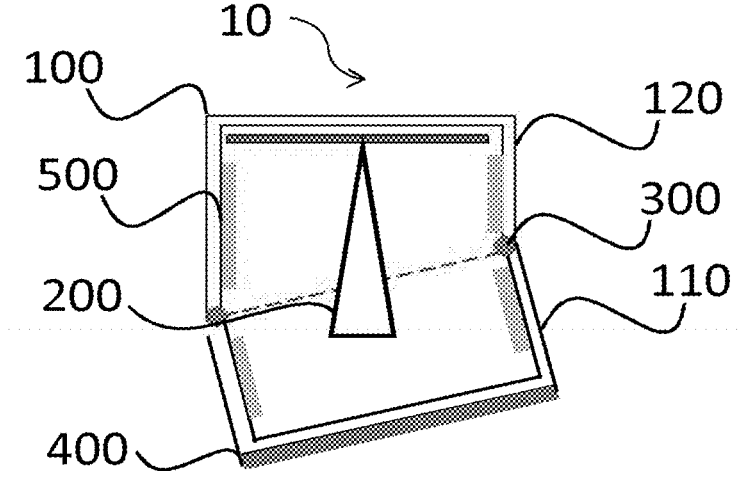
FIG. 5b shows a schematic representation of a sensor arrangement according to a further embodiment.
Figure 5C:
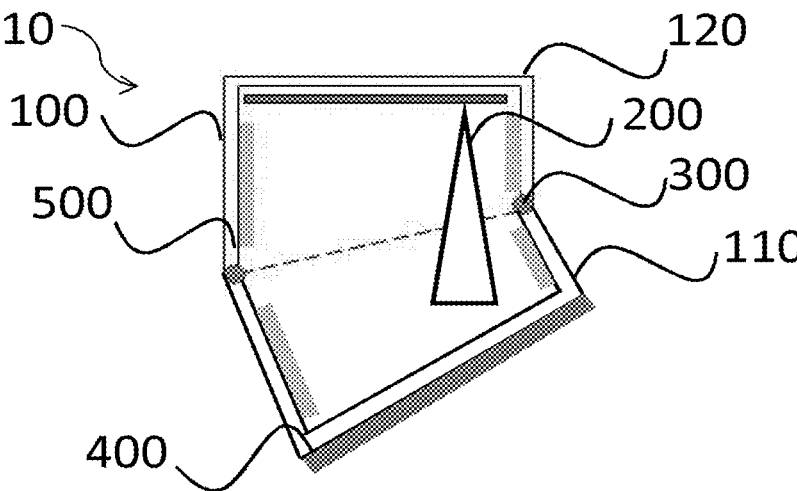
FIG. 5c shows a schematic representation of a sensor arrangement according to a further embodiment.

As an alternative to the three-part sensor housing of the sensor arrangement 10 in FIGS. 4*a-c* and FIGS. 6*a-b*, a sensor arrangement 10 is shown in FIGS. 5*a-c*, which comprises a two-part sensor housing 100 with an alignment device having two sections directly connected to each other, namely a first section 110 as a lower part and a second section 120 as an upper part. Thus, the sensor housing 100 of the sensor arrangement 10 may dispense with a third section as an intermediate part. Thus, the sensor arrangement having the two-part sections 110, 120 can have a compact structure.

The sensor assembly 10 in FIGS. 5*a-c* has a single axis or surface of rotation at the junction between the first section 110 and the second section 120. The first section 110 and the second section 120 each have the shape of an obliquely truncated hollow cylinder, and are configured to form the sensor housing 100 of the integrally and cylindrically. The rotating surface is an inclined surface disposed between the first section and the second section. Via the inclined surface, the first section and the second section can be rotated relative to each other so that the sensor housing 100 can no longer be cylindrical in shape.

The alignment device of the sensor arrangement is thus arranged to change the radiation direction of the measurement signal 30 of the sensor by the first and second sections, which can be rotated relative to each other. The antenna 200 may also be received or disposed off-center in the second section. Furthermore, the antenna 200 is configured to protrude into the first cavity. In FIG. 5*a*, the sensor housing 100 is cylindrical in shape and the antenna 200 is disposed within the sensor housing, for example, to the left of center. When mounting the sensor arrangement on the sloped container roof, the second section 120 may be rotated relative to the first section 110 by means of the alignment device to such an extent that the antenna may be arranged centrally in a side view, as shown in FIG. 5*b*, or may be arranged right of center in another side view, as shown in FIG. 5*c*. It may be an advantage that by arranging the antenna 200 off-center and rotating the second section, the antenna 200 may be attached to the shorter part of the housing part of the sensor housing.

Figures 7A, 7B:
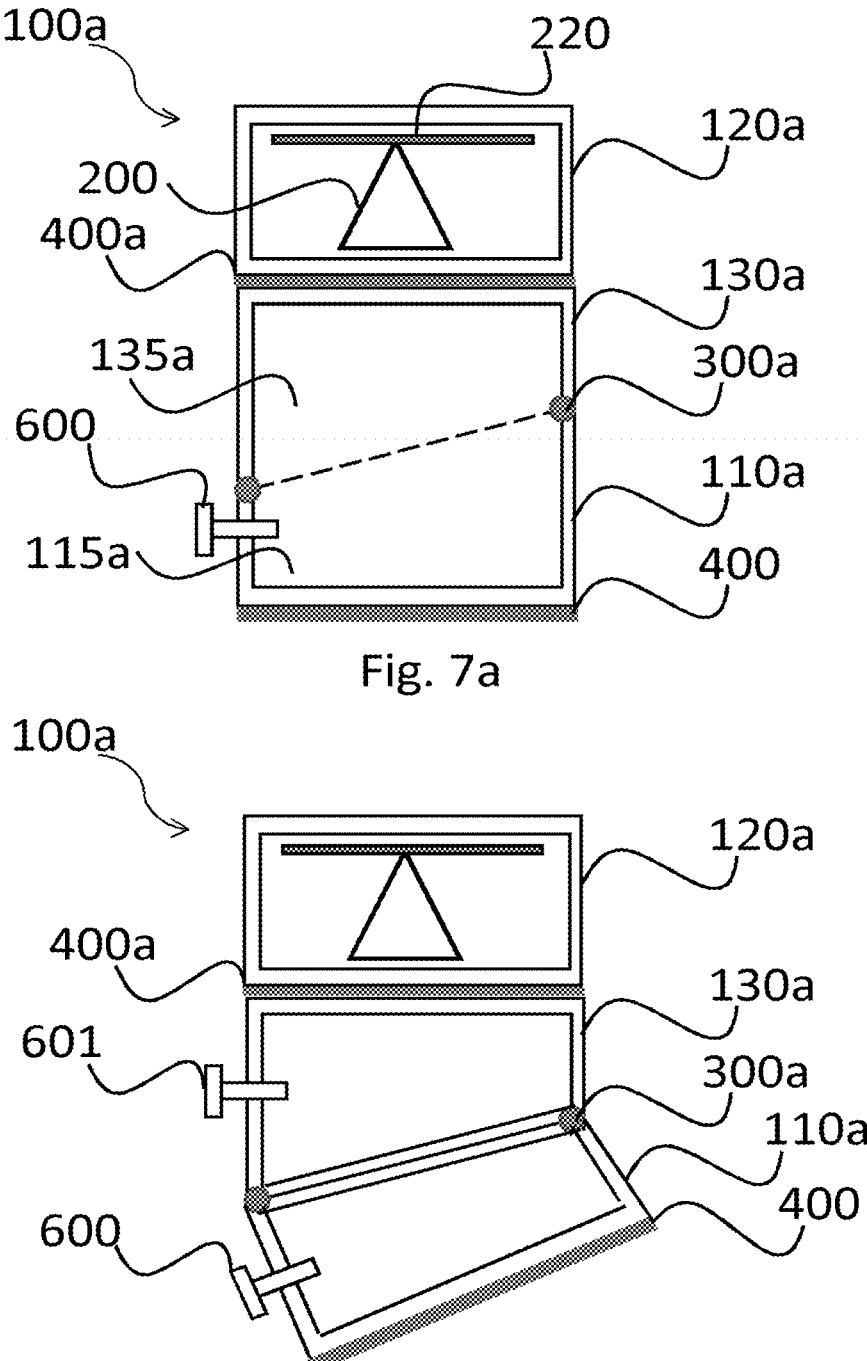
FIG. 7a shows a schematic diagram of a sensor arrangement according to an embodiment.
FIG. 7b shows a schematic representation of a sensor arrangement according to a further embodiment.

FIGS. 7*a-b* show a sensor arrangement according to an alternative embodiment to the sensor arrangement in FIGS. 4*a-c*. The sensor arrangement has a sensor housing 100*a* that is not formed in one piece, but has two separable housing units, namely a first housing unit and a second housing unit. The first housing unit is formed by a first section 110*a* having a first cavity 115*a* and a third section 130*a* having a third cavity 135*a* and may be in the form of a hollow cylinder, while the second housing unit is formed by the second section 120*a* as a separate hollow cylindrical housing unit.

A second fastening device 400*a* is provided between the first housing unit and the second housing unit, and is adapted to connect the first housing unit and the second housing unit. For example, the second housing unit may be bonded to the first housing unit.

A sensor or a radar sensor including the antenna 200 and the circuit board 220 is housed or disposed in the second housing unit or the second section 120*a*. Therefore, the closed housing unit with the sensor disposed therein may form a self-sufficient measurement sensor.

In addition, the first housing unit may be designed as a separate alignment device or adapter for mounting and aligning the measurement sensor. The separately designed second housing unit can result in the sensor being easily replaceable and the second housing unit can be used as an adapter universal for sensors of different types.

Further, the first cavity 115*a* and the third cavity 135*a* may form a common cavity as in FIG. 7*a* and the alignment device may thus have a virtual rotating surface. Alternatively, the first cavity 115*a* and the third cavity 135*a* may each have their own closed cavity as in FIG. 7*b*.

A filter 600 or pressure equalization filter may be provided in the first cavity 115*a* and/or the third cavity 135*a* of the first housing unit as an alternative or in addition to the absorber device to equalize air pressure inside and outside the housing unit. If the first cavity 115*a* and the third cavity 135*a* form a common cavity, as shown in FIG. 7*a*, a filter may be provided. If the first cavity 115*a* and the third cavity 135*a* each form their own closed cavity, as shown in FIG. 7*b*, the filter may be provided in the respective closed cavity.

Figure 8A:
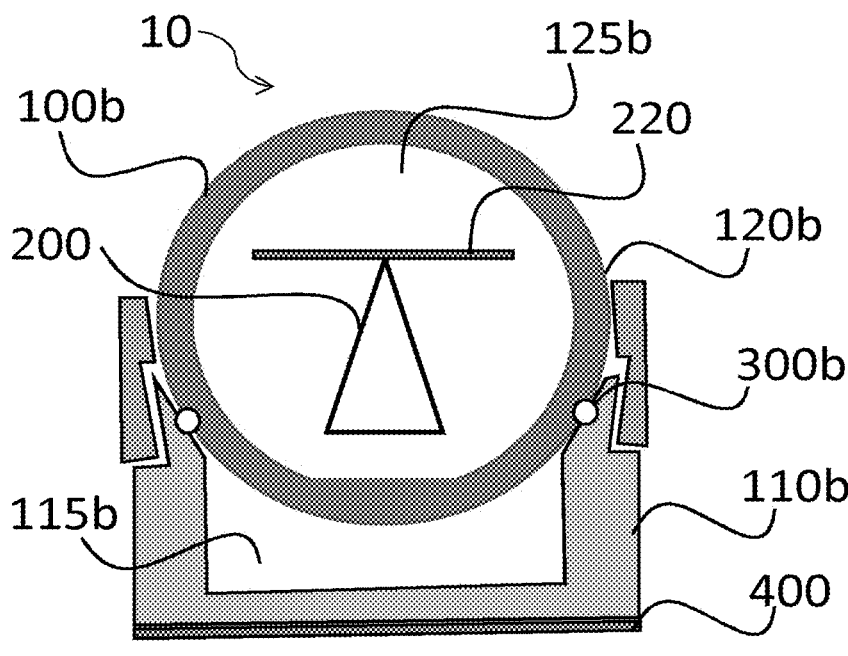
FIG. 8a shows a schematic diagram of a sensor arrangement according to an embodiment.
Figure 8B:
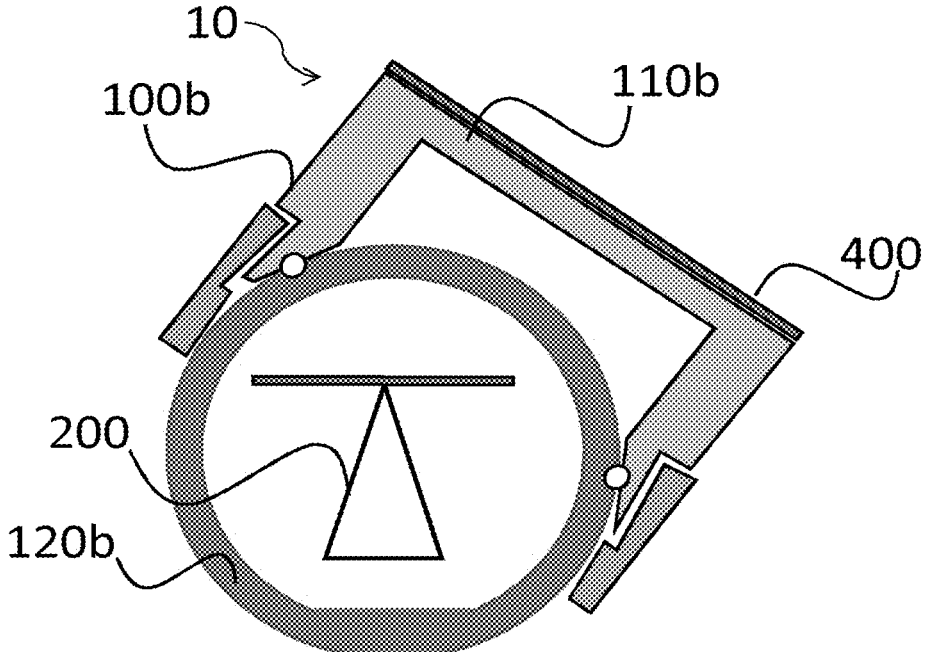
FIG. 8b shows a schematic diagram of a sensor arrangement according to an embodiment.

FIGS. 8*a-b* show a sensor arrangement according to another embodiment. The sensor arrangement includes a sensor 100 having an antenna 200 and electronics or a circuit board 220, and a sensor housing 100*b* having an alignment device with a first section 110*b* in the form of a bracket and a second section 120*b* having the form of a hollow sphere or spherical segment. The hollow sphere segment of the second section 120*b* may be an articulating socket.

As another embodiment to the sensor arrangement in FIGS. 8*a-b*, the sensor arrangement in FIGS. 9*a-b* and FIGS. 10*a-b* includes a sensor housing 100*b* having a second portion 120*b* in the form of a flattened spherical segment.

The first section 110*b* may alternatively be in the form of a hollow cylinder and have a first cavity 115*b*. The second section 120*b* of the alignment device or sensor housing 100*b* includes a first cavity 100*b* in which the sensor or antenna 200 and the circuit board 220 are received or disposed. The first portion 110*b* and the second portion 110*b* may be connected to each other and rotatable relative to each other, for example, by means of a threaded connection or a snap-on connection. In other words, the sensor may be clamped or arranged in the spherical second section 120*b* like a ball to the first section 110*b* as a mount.

A sealing member 300*b* may be provided at the joint and adapted to seal the sensor housing 100*b*.

An attachment device 400, such as an adhesive tape, may be provided between the first portion 100*b* and the container 20 when the sensor arrangement 10 is mounted, and may be configured to attach the sensor arrangement 10 to the container 20 over the first portion 110*b*. By adhesive mounting, the sensor arrangement 10 can be easily attached to a container roof, in particular a sloped container roof as shown in FIG. 8*a*, FIG. 9*a-b* or FIG. 10*a-b*, such that the first section 110*b* can be positioned below the second section 120*b* and the measurement signal can be radiated through the sensor housing 100*b*, the lower side of the first section 110*b* and the container wall. By rotating the first section 110*b* and/or the second section 120*b*, the sensor arrangement 10 may be provided outside of the container or in the immediate vicinity of the container as shown in FIG. 8*b* by means of the mounting device 400 such that the first section 110*b* may be disposed above the second section 120*b* and the measurement signal may be radiated through the sensor housing 100*b* and the container wall but not through the first section 110*b*. Thus, the sensor arrangement may be installed with any freedom. For example, the sensor can thus be rotated 360 degrees and oriented freely.

Figure 9A:
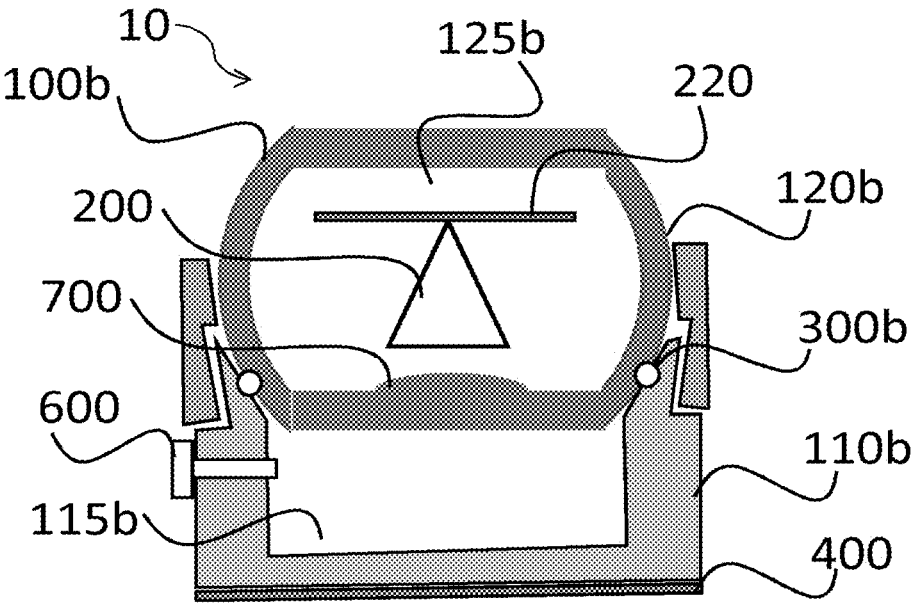
FIG. 9a shows a schematic representation of a sensor arrangement according to an embodiment.
Figure 9B:
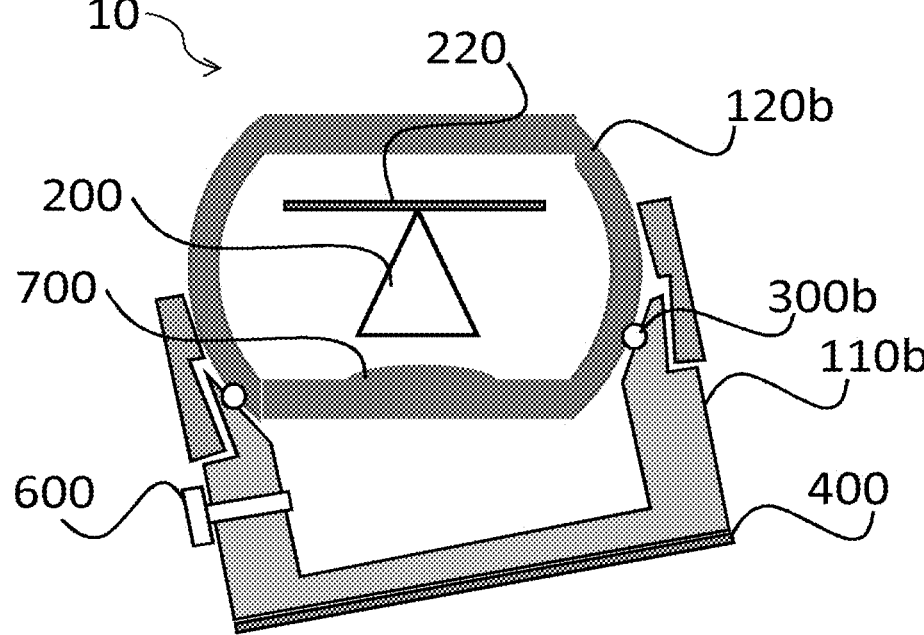
FIG. 9b shows a schematic representation of a sensor arrangement according to a further embodiment.

FIG. 9*a* and FIG. 9*b* show that the sensor arrangement 10 may further comprise a beam deflecting device 700, for example a lens and provided in the lower part of the second section 120*b* and arranged to deflect the measurement signal in the direction of the filling material in the container. Therefore, providing the beam deflecting means 700 may serve to change the direction of radiation of the measurement signal of the sensor in addition to rotating the first section and/or the second section by means of the alignment device.

Additionally, a filter 600 or pressure equalization filter and/or absorber device 500 may be provided in the first cavity 115*b* of the first section 110*b*.

Figure 10A:
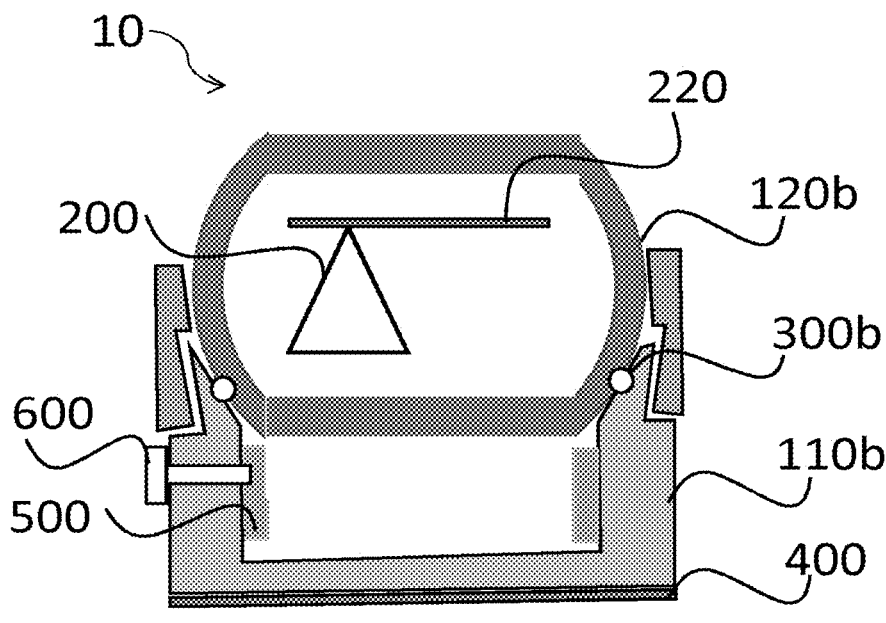
FIG. 10a shows a schematic diagram of a sensor arrangement according to an embodiment.
Figure 10B:
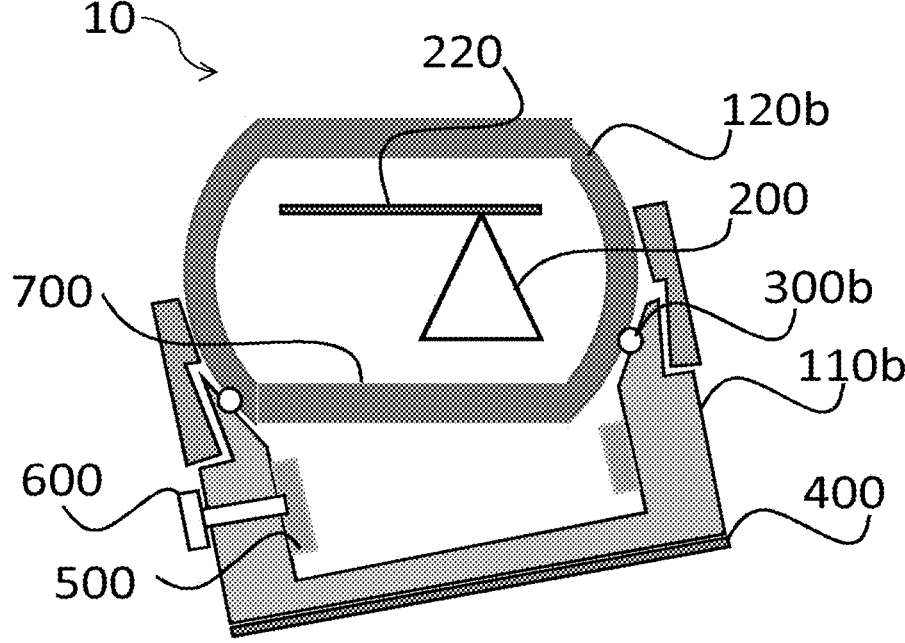
FIG. 10b shows a schematic representation of a sensor arrangement according to a further embodiment.

For example, the antenna 200 may be centered, as shown in FIGS. 9*a-b*, or off-centered, as shown in FIGS. 10*a-b*, in the third section 120*b*. By arranging the antenna 200 off-center, the position of the antenna 200, for example from the left side in FIG. 10*a* to the right side in FIG. 10*b*, can be changed by rotating the second section 120*b* with respect to the first section 110*b*, and the radiation direction of the measurement signal can still be changed.

Figure 11A:
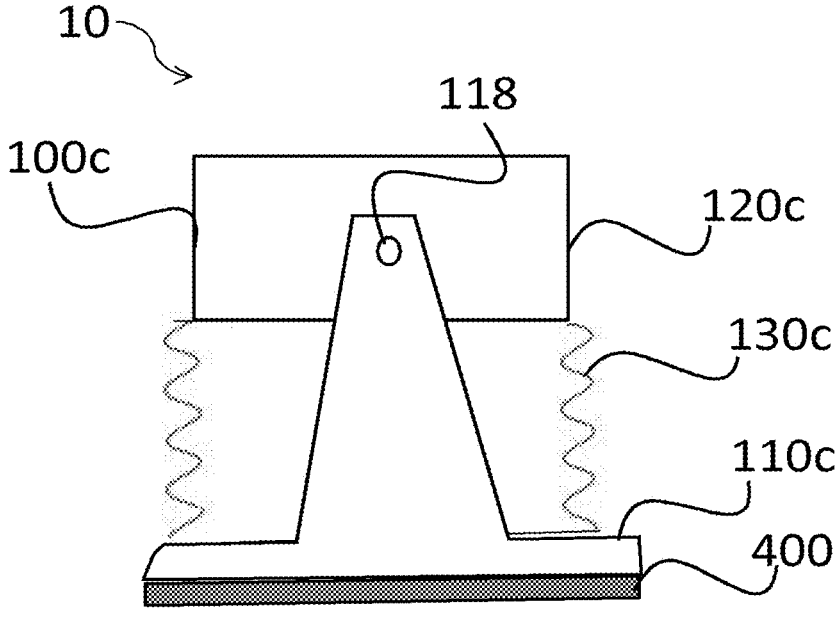
FIG. 11a shows a schematic diagram of a sensor arrangement according to an embodiment.
Figure 11B:
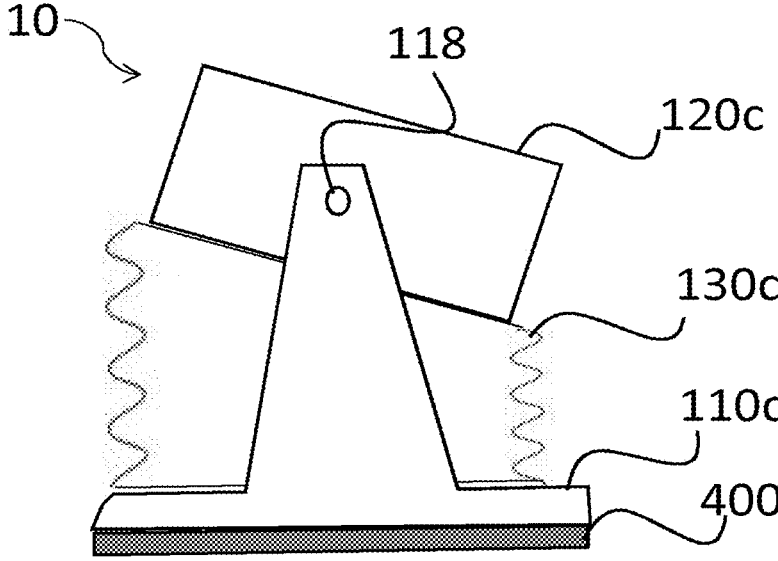
FIG. 11b shows a schematic representation of a sensor arrangement according to a further embodiment.

In FIGS. 11*a-b*, a sensor arrangement 10 is shown according to an alternative embodiment. The sensor arrangement 10 comprises a sensor housing 100*c* with an alignment device having a first section 110*c* in the form of a support device, a second section 120*c* in the form of a hollow cylinder, and a third section 130*c* in the form of a rubber sleeve. The second section 120*c* is connected to the first section 110*c* by a connecting means 118, for example a screw connection. The first section 110*c* may thus be formed as a base or a mounting bracket.

The rubber sleeve 130*c* is provided between the first section and the section and is adapted to close or form as a closed cavity the space between the sensor in second section 120*c* and the support device of first section 110*c*, to protect the cavity from entry of foreign particles from the environment. Thus, the sensor arrangement 10 can be used for outdoor process vessels in a long-term and reliable manner.

Supplementally, it should be noted that "comprising" or "having" does not exclude other elements, and "a" or "an" does not exclude a plurality. It should further be noted that features described with reference to any of the above embodiments may also be used in combination with other features of other embodiments described above. Reference signs in the claims are not to be regarded as a limitation.

The invention claimed is:

1. A sensor arrangement for level measurement or limit level measurement of a filling material or a bulk material in a container, the sensor arrangement comprising:

a sensor with an antenna; and a sensor housing having an alignment device comprising a first portion and a second portion configured to receive the antenna, the first portion and the second portion being configured to be rotatable relative to each other, wherein the sensor housing comprises a third portion having a third cavity disposed between the first portion and the second portion and is configured to be rotatable relative to at least one of the first portion and the second portion, wherein the alignment device is configured to change a radiation direction of a measurement signal of the sensor by rotating the first portion and/or the second portion and/or the third portion, and wherein the sensor arrangement is configured to be mounted on an outside of a roof of the container by means of the first portion of the sensor housing, and, when mounted on an inclined container roof, the antenna in a second cavity is configured to radiate the measurement signal through the sensor housing in the direction of the filling material or the bulk material in the container.

2. The sensor arrangement according to claim 1, wherein the first portion includes a first cavity, and wherein the second portion includes the second cavity in which the antenna is disposed.

3. The sensor arrangement according to claim 2, wherein the antenna of the sensor is configured to protrude into the first cavity.

4. The sensor arrangement according to claim 1, wherein the antenna is disposed off-center in the second portion of the sensor housing.

5. The sensor arrangement according to claim 1, further comprising a polarization device configured to change the alignment of the measurement signal of the sensor and change a polarization of the measurement signal by rotating the first portion and/or the second portion.

6. The sensor arrangement according to claim 1, wherein the sensor housing is completely closed and/or cannot be opened non-destructively.

7. The sensor arrangement according to claim 1, wherein the sensor is configured as a stand-alone radar sensor.

8. The sensor arrangement according to claim 1, further comprising an attachment device disposed between the first portion and the container and configured to attach the sensor arrangement to the container via the first portion.

9. The sensor arrangement according to claim 1, further comprising an absorber device made of an absorber material and disposed mounted inside the sensor housing or on an inner side wall of the first portion to reduce spurious reflections caused by a first reflection.

10. The sensor arrangement according to claim 1, wherein the first portion and the second portion are each in the form of an obliquely cut hollow cylinder and are configured to integrally and cylindrically form the sensor housing, and wherein the sensor housing of the alignment device includes an inclined surface disposed between the first portion and the second portion and is configured such that the first portion and the second portion are rotatable relative to each other via the inclined surface.

11. The sensor arrangement according to claim 1, wherein the first portion and the third portion are each formed as an obliquely truncated hollow cylinder, and the second portion is formed as a hollow cylinder, wherein the first portion, the second portion, and the third portion are configured to form the sensor housing integrally and cylindrically, and wherein the sensor housing has an inclined surface disposed between the first portion and the third portion and is configured such that the first portion and the third portion are rotatable relative to each other via the inclined surface, and a straight surface disposed between the second portion and the third portion.

12. The sensor arrangement according to claim 2, wherein the antenna of the sensor is formed in the second cavity so as to protrude into the first cavity and/or the third cavity.

13. The sensor arrangement according to claim 1, wherein the antenna is configured to be disposed at a highest position by rotating the second portion relative to the third portion and rotating the third portion relative to the first portion.

14. The sensor arrangement according to claim 1, wherein the second portion is formed separably from the first portion and the third portion, and wherein the sensor housing comprises a first housing unit formed by the first portion and the third portion, and a second housing unit formed by the second portion.

15. The sensor arrangement according to claim 14, further comprising a fastening device disposed between the first housing unit and the second housing unit and configured to connect the first housing unit and the second housing unit.

16. The sensor arrangement according to claim 1, wherein the first portion is in the form of a bracket and the second portion of the sensor housing is in the form of a hollow sphere.

17. The sensor arrangement according to claim 1, further comprising a sealing member configured to seal the sensor housing.

18. The sensor arrangement according to claim 1, wherein the first portion is in the form of a bracket and the second portion is in the form of a flattened spherical segment.

19. The sensor arrangement according to claim 1, wherein the first portion is in the form of a support device and the second portion is in the form of a hollow cylinder, and wherein the second portion is connected to the first portion by a connecting device.

20. The sensor arrangement according to claim 19, further comprising a third portion having a shape of a rubber sleeve and disposed between the first portion and the second portion.

21. The sensor arrangement according to claim 1, further comprising a filter disposed at the first portion and/or the third portion of the sensor housing.

22. A sensor housing comprising an alignment device configured to mount and to align a sensor arrangement according to claim 1 on a container for level or point level measurement of a product or bulk material in the container.

23. The sensor arrangement according to claim 1, the sensor arrangement being configured to measure a level or a limit of a filling material or a bulk material in a container.

24. The sensor arrangement according to claim 1, wherein the antenna is disposed centered in the second portion of the sensor housing.

* * * * *